(12) United States Patent
Sugi et al.

(10) Patent No.: US 8,907,025 B2
(45) Date of Patent: Dec. 9, 2014

(54) ADHESIVE AGENT COMPOSITION AND LAMINATED BODY

(75) Inventors: Hiroki Sugi, Tokyo (JP); Bungo Yasui, Tokyo (JP); Seiji Maeda, Tokyo (JP); Katsuyuki Ueki, Tokyo (JP); Kenshiro Shimada, Tokyo (JP)

(73) Assignee: Toyo Ink SC Holdings Co., Ltd., Tokyo (JP)

( * ) Notice: Subject to any disclaimer, the term of this patent is extended or adjusted under 35 U.S.C. 154(b) by 0 days.

(21) Appl. No.: 13/980,772

(22) PCT Filed: Jan. 20, 2012

(86) PCT No.: PCT/JP2012/051257
§ 371 (c)(1),
(2), (4) Date: Jul. 19, 2013

(87) PCT Pub. No.: WO2012/099256
PCT Pub. Date: Jul. 26, 2012

(65) Prior Publication Data
US 2013/0296504 A1 Nov. 7, 2013

(30) Foreign Application Priority Data
Jan. 21, 2011 (JP) ................................. 2011-010335

(51) Int. Cl.
| | | |
|---|---|---|
| *C09J 175/08* | (2006.01) |
| *C08G 18/08* | (2006.01) |
| *C08L 63/02* | (2006.01) |
| *C08G 18/48* | (2006.01) |
| *C08G 18/42* | (2006.01) |
| *C08G 18/32* | (2006.01) |
| *C08G 18/76* | (2006.01) |
| *C09J 175/06* | (2006.01) |
| *C08G 18/75* | (2006.01) |
| *C08G 18/10* | (2006.01) |
| *C08G 18/73* | (2006.01) |
| *C08G 18/58* | (2006.01) |
| *C08G 18/72* | (2006.01) |
| *C09J 11/06* | (2006.01) |
| *C08G 18/40* | (2006.01) |

(52) U.S. Cl.
CPC ........... *C09J 175/08* (2013.01); *C08G 18/4841* (2013.01); *C08G 18/4238* (2013.01); *C08G 18/3206* (2013.01); *C08G 18/7671* (2013.01); *C09J 175/06* (2013.01); *C08G 18/755* (2013.01); *C08G 18/10* (2013.01); *C08G 18/7621* (2013.01); *C08G 18/73* (2013.01); *C08G 18/58* (2013.01); *C08G 18/4854* (2013.01); *C08G 18/722* (2013.01); *C09J 11/06* (2013.01); *C08G 18/4045* (2013.01)

USPC ............ 525/460; 525/524; 525/528; 525/533

(58) Field of Classification Search
CPC ............... C08G 18/10; C08G 18/3206; C08G 18/4045; C08G 18/4238; C08G 18/4841; C08G 18/4854; C08G 18/58; C08G 18/722; C08G 18/73; C08G 18/755; C08G 18/7621; C08G 18/7671; C09J 175/06; C09J 175/08; C08K 5/20; C08L 63/00; C08L 75/04; H05K 3/28; H05K 1/03
USPC .................................. 525/460, 524, 528, 533
See application file for complete search history.

(56) References Cited

U.S. PATENT DOCUMENTS

| | | | |
|---|---|---|---|
| 5,656,701 A | 8/1997 | Miyamoto et al. | |
| 7,704,559 B2 * | 4/2010 | Grasboeck et al. | ........... 427/386 |

FOREIGN PATENT DOCUMENTS

| | | |
|---|---|---|
| JP | 47-028099 A | 10/1972 |
| JP | 06-116542 A | 4/1994 |
| JP | 06-206972 A | 7/1994 |
| JP | 08-080571 A | 3/1996 |
| JP | 10-218978 A | 8/1998 |
| JP | 2005-048046 A | 2/2005 |
| JP | 2007-136911 A | 6/2007 |
| JP | 2007-138136 A | 6/2007 |
| JP | 2008-004691 A | 1/2008 |
| JP | 2008-222983 A | 9/2008 |
| JP | 2010-043238 A | 2/2010 |

OTHER PUBLICATIONS

International Search Report for International Application No. PCT/JP2012/051257, dated Apr. 24, 2012, 2 pages.

* cited by examiner

*Primary Examiner* — Randy Gulakowski
*Assistant Examiner* — Christopher M Rodd
(74) *Attorney, Agent, or Firm* — Brinks Gilson & Lione

(57) ABSTRACT

The present invention is to provide an adhesive agent composition, including: a main agent containing a polyether polyurethane polyol and a bisphenol A-type epoxy resin; and a curing agent, wherein the polyether polyurethane polyol is obtained by reacting a polyalkylene glycol including repeating units each having a carbon number of 3 or 4 and an alkane diol monomer with an organic diisocyanate at an equivalent ratio (NCO/OH) of 0.7 or more but less than 1, a weight average molecular weight thereof is in the range of 20,000 to 70,000, and an urethane bond equivalent thereof is in the range of 320 to 600 g/eq, and wherein a number average molecular weight of the bisphenol A-type epoxy resin is in the range of 400 to 5,000, and the bisphenol A-type epoxy resin is of a solid state or a semisolid state at normal temperature.

11 Claims, No Drawings

ADHESIVE AGENT COMPOSITION AND LAMINATED BODY

This application is a 371 application of PCT/JP2012/051257 having an international filing date of Jan. 20, 2012, which claims priority to JP2011-010335 filed Jan. 21, 2011, the entire contents of which are incorporated herein by reference.

TECHNICAL FIELD

The present invention relates to an adhesive agent composition and a laminated body, and especially relates to an adhesive agent composition suitable for outdoor use and a laminated body obtained by using such an adhesive agent composition.

BACKGROUND ART

Recently, laminated films are developed as multilayered (composite) sheets capable of being used in members suitable for outdoor use such as a barrier member, a roof member, a solar cell panel member, a window member, an outdoor wooden floor member, an illumination protective member, a car member, a signboard and an adhesive label.

Such a laminated film is often produced by bonding a metal foil formed of aluminum or copper, a metal plate such as a copper plate or a metallized film to a resin film formed of a polypropylene resin, a polychlorinated vinyl resin, a polyester resin, a fluoro resin, an acryl resin or the like with an adhesive agent composition (adhesive agent), in order to improve weather resistance and the like thereof.

Further, as the adhesive agent composition to be used for the laminated film, an epoxy-based adhesive agent composition or an urethane-based adhesive agent composition is well known.

For example, Patent document 1 discloses a polyester resin capable of imparting an excellent initial cohesion force and bonding force and the like, and an urethane-based resin adhesive agent composition obtained by using such a polyester resin.

Patent document 2 discloses a polyurethane-based adhesive agent composition exhibiting superior hot water resistance when sterilizing a retort-packed food.

Patent document 3 discloses that a polyurethane-based adhesive agent composition having hydrolysis resistance is used in a solar cell back surface sealing sheet.

Further, Patent document 4 discloses a solar cell back surface sealing sheet having a bonding improvement layer formed of a polyester resin or a polyester polyurethane resin.

Furthermore, Patent document 5 discloses a polyurethane-based adhesive agent composition suitable for outdoor use and capable of exhibiting good moist-heat resistance.

PRIOR ART DOCUMENT

Patent Document

Patent document 1: JP-A H10-218978
Patent document 2: JP-A H06-116542
Patent document 3: JP-A 2008-4691
Patent document 4: JP-A 2007-136911
Patent document 5: JP-A 2010-43238

SUMMARY OF THE INVENTION

Problem to be Solved by the Invention

Recently, through efforts for addressing prevention of global warming, it becomes imperative that a solar cell having high performance and capable of keeping excellent durability for a long period of time is developed. In order to secure the long term durability of the solar cell, a configuration and a material of a back surface sealing sheet and the like to be used therein are being considered. For example, it is required to use a laminated film in which a plurality of different resin films (resin substrates) are laminated together as the back surface sealing sheet.

In such a laminated film, a polyester film having a relatively large thickness is often used as an electrical insulating layer. However, the polyester film does not have sufficient adhesiveness with respect to the above mentioned polyepoxy-based adhesive agent composition or polyurethane-based adhesive agent composition. For this reason, when the laminated film is rolled up just after lamination, it becomes required to suppress positional difference or tunneling (tunnel-like delamination) between the films from occurring.

Further, each resin film may be subjected to a corona-treatment or the like in order to improve a bonding force thereof with respect to the adhesive agent composition, but may not be subjected to the above treatment. Therefore, even if the resin film is not subjected to the above treatment, there is also a case where untreated surfaces of the resin films have to be firmly bonded together through the adhesive agent composition.

Furthermore, in recent years, a case where a fluoro film having high durability is used in a laminated film suitable for outdoor use is very increasing. There are few hydrogen atoms in a main chain of a fluoro resin which is a constituent materials of such a fluoro film. Therefore, even if the fluoro film is subjected to the corona-treatment, a surface thereof is hardly oxidized. This makes difficult for a conventional adhesive agent composition to exhibit a sufficient bonding force with respect to the fluoro film. Namely, the adhesive agent composition is required to have a high bonding force with respect to such a fluoro film (film with poor bonding capacity).

Here, in a two-pack-type curable adhesive agent in which a main agent having hydroxyl groups at ends thereof and a curing agent having isocyanate groups at ends thereof are used, in the case where the main agent is a polyester polyol or a polyester polyurethane polyol, a bonding force of the adhesive agent can be controlled by adjusting a glass transition temperature of the main agent. Therefore, a sufficient bonding force can be relatively easily imparted to the adhesive agent. Such a bonding force makes it possible to prevent positional difference or delamination between an untreated resin film and another film formed of a resin material, a metal material or the like from occurring just after lamination.

However, there is a problem in that long term durability is difficult to be imparted to such an adhesive agent or a strong bonding force with respect to the fluoro film is difficult to be imparted thereto.

On the other hand, an aliphatic polyether polyol-based adhesive agent and a polycarbonate polyol-based adhesive agent can firmly bond an untreated resin film and another film formed of a resin material, a metal material or the like together after aging (cure completion) thereof. Therefore, these adhesive agents can exhibit excellent moist-heat resistance and light resistance, and thus they are suitable for outdoor use. However, there is a problem in that peeling strength between the films is low just after lamination.

Therefore, an object of the present invention is to provide an adhesive agent composition capable of exhibiting a bonding force by which a resin substrate (especially, an untreated resin substrate) and another substrate formed of a resin material, a metal material or the like can be firmly bonded together so that positional difference or delamination between the substrates does not occur just after lamination. Further, another object of the present invention is to provide an adhesive agent composition capable of keeping sufficient peeling strength of an obtained laminated body, even in the case where the laminated body is left, for example, under an environment having high humidity and high temperature for a long period of time.

Means for Solving Problem

The present inventors have made extensive research in order to solve the above problem, and as a result, they have found that use of the following adhesive agent composition makes it possible to achieve the above objects, leading to completion of the present invention.

Namely, the present invention relates to an adhesive agent composition comprising:
  a main agent containing a polyether polyurethane polyol and a bisphenol A-type epoxy resin; and
  a curing agent,
  wherein the polyether polyurethane polyol is obtained by reacting a polyalkylene glycol including repeating units each having a carbon number of 3 or 4 and an alkane diol monomer with an organic diisocyanate at an equivalent ratio (NCO/OH) of 0.7 or more but less than 1, a weight average molecular weight thereof is in the range of 20,000 to 70,000, and an urethane bond equivalent thereof is in the range of 320 to 600 g/eq, and
  wherein a number average molecular weight of the bisphenol A-type epoxy resin is in the range of 400 to 5,000, and the bisphenol A-type epoxy resin is of a solid state or a semisolid state at normal temperature.

Effect of the Invention

According to the present invention, since a polyether polyurethane polyol obtained by reacting a specific polyalkylene glycol and alkane diol monomer with a specific organic diisocyanate is used as a main agent, for example, a resin substrate (especially, an untreated resin substrate) and another substrate formed of a resin material, a metal material or the like can be bonded together at excellent peeling strength just after lamination, as compared with an adhesive agent composition in which a polyether polyurethane polyol subjected to no chain extension by the alkane diol monomer is used as a main agent.

Further, according to the present invention, since the above polyether polyurethane polyol is used as the main agent, even in the case where a cured product of the adhesive agent composition is left under an environment having high humidity and high temperature for a long period of time, it is possible to prevent peeling strength of the cured product from being remarkably lowered with time by hydrolyzation or swelling due to water absorption thereof, as compared with an adhesive agent composition in which a polyester polyol or a polyester polyurethane polyol is used as a main agent or an adhesive agent composition in which a polyether polyurethane polyol having a polyethylene glycol structure (skeleton) is used as a main agent.

Furthermore, according to the present invention, by using a bisphenol A-type epoxy resin being of a solid state or a semisolid state at normal temperature as the main agent, a chemical structure with high hydrophobicity included therein makes it possible to significantly improve water resistance which is a defect of the polyether polyurethane polyol, to thereby impart higher long term durability to the adhesive agent composition and the cured product thereof.

More specifically, according to the present invention, by adjusting an urethane bond equivalent of the polyether polyurethane polyol within the range of 320 to 600 g/eq, it is possible to control an initial cohesion force of the adhesive agent composition just after lamination. Therefore, the adhesive agent composition can bond, for example, a resin substrate (especially, an untreated resin substrate) and another substrate formed of a resin material, a metal material or the like together at excellent peeling strength just after lamination. Further, such an adhesive agent composition exhibits excellent moist-heat resistance, while keeping high peeling strength even after aging.

Further, a polyalkylene oxide chain derived from the polyalkylene glycol included in the polyether polyurethane polyol contributes to improvement of compatibility with respect to a fluoro-based compound, and also has excellent hydrolysis resistance. Therefore, according to the adhesive agent composition of the present invention, it is possible to firmly bond substrates each having a substituent group containing a fluorine atom on a surface thereof together, or the substrate having the substituent group containing the fluorine atom at the surface thereof and another substrate together for a long period of time.

DETAILED DESCRIPTION OF THE PREFERRED EMBODIMENTS

Hereinbelow, an adhesive agent composition and a laminated body according to the present invention will be described in detail based on a preferred embodiment.

The adhesive agent composition of the present invention includes a main agent and a curing agent, and the laminated body of the present invention is obtained by using such an adhesive agent composition. Specifically, the laminated body of the present invention is obtained by laminating substrates together through the adhesive agent composition, and then curing the adhesive agent composition, to thereby bonding the substrates together by a cured product (cured film) thereof.

In the adhesive agent composition of the present invention, the main agent contains a polyether polyurethane polyol and a bisphenol A-type epoxy resin.

One of features of this adhesive agent composition is that the polyether polyurethane polyol is obtained by reacting a polyalkylene glycol including repeating units each having a carbon number of 3 or 4 and an alkane diol monomer with an organic diisocyanate at a predetermined ratio. Namely, the polyether polyurethane polyol includes the repeating units each having the carbon number of 3 or 4 in a structure (main chain) thereof.

Here, a polyether polyurethane polyol including repeating units each having a carbon number of 1 or 2 in a structure (main chain) thereof has high hydrophilicity, and as a result, it exhibits poor water resistance (or moisture resistance). Therefore, an adhesive agent composition containing such a polyether polyurethane polyol having poor water resistance as a main agent and a cured product obtained by curing it show a tendency to be easily swelled due to water absorption. On the other hand, a polyether polyurethane polyol including repeating units each having a carbon number of 5 or more in a structure (main chain) thereof has extremely high crystallizability. Therefore, it is very difficult to prepare an adhesive agent composition containing such a polyether polyurethane polyol as a main agent.

In other words, the adhesive agent composition containing the above mentioned polyether polyurethane polyol as the main agent and the cured product thereof are difficult to absorb water, and the adhesive agent composition has an advantage of being easily prepared.

Examples of the polyalkylene glycol to be used for synthesizing the polyether polyurethane polyol includes polytrimethylene glycol and polypropylene glycol each having a carbon number of 3, polytetramethylene glycol and polybutylene glycol each having a carbon number of 4, and the like. Among them, it is preferable to use the polyalkylene glycol containing at least one of the polytetramethylene glycol and the polypropylene glycol, and more preferable to use the polyalkylene glycol containing the polytetramethylene glycol. This is because the polytetramethylene glycol has especially high water resistance and moderate crystallizability, and also exhibits high moist-heat resistance. Therefore, the adhesive agent composition containing the polyether polyurethane polyol having polytetramethylene glycol structures as the repeating units as the main agent can be preferably used for producing a laminated body especially suitable for outdoor use (e.g., a solar cell back surface sealing sheet).

Here, the "moist-heat resistance" means that in the case where a compound or member formed by using such a compound is left under an environment having high humidity and high temperature, the compound or member hardly absorbs water or is hardly hydrolyzed due to no reaction with water. Therefore, in the case where a laminated body is produced by bonding substrates together through the adhesive agent composition having the moist-heat resistance, even if this laminated body is left under the environment having high humidity and high temperature for a long period of time, lowering of peeling strength thereof hardly occurs.

A number average molecular weight of the polyalkylene glycol is preferably in the range of about 600 to 3,500, and more preferably in the range of about 1,000 to 3,000. By setting the number average molecular weight within the above range, it is possible to impart sufficient flexibility to the polyether polyurethane polyol obtained by reacting it with the organic diisocyanate. This makes it possible to improve the bonding force of the adhesive agent composition with respect to the resin substrate (especially, the untreated resin substrate).

Further, since the polyalkylene glycol having such a number average molecular weight exhibits good solubility to various kinds of solvents and high compatibility to another resins, and also has excellent low temperature stability, there is a merit that an adhesive agent composition suitable for practical use can be easily prepared.

In this regard, the polyalkylene glycol is classified into a straight chain type and a branched type. In the present invention, any type may be used, but the straight chain type is preferably used. Since the straight chain-type polyalkylene glycol has moderate crystallizability, the obtained polyether polyurethane polyol also gets to have the moderate crystallizability. The cured product of the adhesive agent composition containing such a polyether polyurethane polyol as the main agent has relatively high density. Therefore, such a cured product is appropriately used for a member requiring long term moist-heat resistance.

Further, a weight average molecular weight (Mw) of the polyether polyurethane polyol is in the range of 20,000 to 70,000. If the weight average molecular weight is less than 20,000, there is a case where an initial cohesion force of the adhesive agent composition becomes insufficient, and thus tunneling (delamination) occurs when substrates are laminated and bonded together therethrough. On the other hand, if the weight average molecular weight exceeds 70,000, the initial cohesion force of the adhesive agent composition is sufficient, but a viscosity thereof becomes too higher. As a result, a coating method of the adhesive agent composition may be limited.

In this regard, the weight average molecular weight of the polyether polyurethane polyol is preferably in the range of about 30,000 to 60,000. This makes it possible to set the viscosity of the adhesive agent composition within a preferred range, and impart a sufficient initial cohesion force thereto.

Further, a number average molecular weight (Mn) of the polyether polyurethane polyol is preferably in the range of about 5,000 to 35,000. This makes it possible to set the viscosity and initial cohesion force of the adhesive agent composition within more preferred ranges.

Furthermore, a polydispersity (Mw/Mn) which is a ratio of the weight average molecular weight (Mw) of the polyether polyurethane polyol to the number average molecular weight (Mn) thereof is preferably in the range of about 1.5 to 4.

Further, a carbon number of the alkane diol monomer is preferably in the range of 2 to 9, and more preferably in the range of 2 to 6. In this case, since the carbon number of the alkane diol monomer becomes moderate, an urethane bond density which forms hard segments of the polyether polyurethane polyol can be made relatively high. Therefore, the adhesive agent composition to be prepared can have a high cohesion force.

Examples of such an alkane diol monomer include ethylene glycol, 1,2-propane diol, 1,3-propane diol, 3-methyl-1,5-pentane diol, 1,4-butane diol, neopentyl glycol, 1,6-hexane diol, 2-methyl-1,3-propane diol, 2,4-diethyl-1,5-pentane diol, 2-butyl-2-ethyl-1,3-propane diol, 1,9-nonane diol and the like. One of them can be used alone or arbitrary two or more of them can be used in combination.

In this regard, especially, by using the alkane diol monomer having the carbon number being in the range of 2 to 6, it becomes possible to easily adjust the urethane bond equivalent of the polyether polyurethane polyol to 600 g/eq or lower which will be described below. From such a viewpoint, at least one of the ethylene glycol, the 1,2-propane diol, the 1,3-propane diol, the 3-methyl-1,5-pentane diol, the 1,4-butane diol, the neopentyl glycol, the 1,6-hexane diol and the 2-methyl-1,3-propane diol is preferably used as the alkane diol monomer.

The urethane bond equivalent of the polyether polyurethane polyol is in the range of 320 to 600 g/eq. If the urethane bond equivalent exceeds 600 g/eq, there is a fear that the initial cohesion force of the adhesive agent composition may be insufficient, and thus the tunneling occurs in a laminated body when it is produced by laminating substrates together. On the other hand, if the urethane bond equivalent is lower than 320 g/eq, the bonding force of the adhesive agent composition to, for example, the resin substrate (especially, the untreated resin substrate) is lowered, and thus zipping tends to occur.

In this regard, the urethane bond equivalent of the polyether polyurethane polyol is preferably in the range of about 350 to 500 g/eq. This makes it possible to sufficiently keep the initial cohesion force of the adhesive agent composition. Further, in this case, the adhesive agent composition exhibits a sufficient bonding force to, for example, the resin substrate (especially, the untreated resin substrate).

Examples of the organic diisocyanate include diphenyl methane diisocyanate, tolylene diisocyanate, 1,6-hexamethylene diisocyanate, 2,2,4-trimethyl hexamethylene diisocyanate, xylylene diisocyanate, tetramethyl xylylene diisocyanate, lysine diisocyanate, isophorone diisocyanate, hydrogenated xylylene diisocyanate, hydrogenated diphenyl methane diisocyanate, methyl cyclohexylene diisocyanate, isopropylidene dicyclohexyl-4,4'-diisocyanate, or derivatives thereof, and the like. One of them can be used alone or arbitrary two or more of them can be used in combination.

In this regard, examples of the derivatives include a polyurethane diisocyanate obtained by reacting the above mentioned organic diisocyanate with polyalcohol. Further, as the polyalcohol, it is possible to use the alkane diols which are exemplified as the raw materials for synthesizing the above polyether polyurethane polyol, and the like.

Among them, as the organic diisocyanate, it is preferable to use an aliphatic or alicyclic diisocyanate in which an isocyanate group is not directly bonded to an aromatic ring, or derivatives thereof. The aliphatic or alicyclic diisocyanate is difficult to be brought into a multimer (e.g., a dimer), even if it is irradiated with an ultraviolet ray. Therefore, even in the case where a laminated body produced by using the adhesive agent composition is left in an outdoor location for a long period of time, it is possible to preferably prevent the cured product of the adhesive agent composition from being discolored (changed into yellow).

A reaction ratio of the organic diisocyanate to the polyalkylene glycol and the alkane diol monomer is 0.7 or more but less than 1 at an equivalent ratio (NCO/OH). If the equivalent ratio (NCO/OH) is less than 0.7, it is impossible to obtain a polyether polyurethane polyol having sufficient molecular weight. This makes it difficult to bond, for example, the resin substrate (especially, the untreated resin substrate) and the other substrate formed of the resin material, the metal material or the like together at excellent peeling strength just after lamination. On the other hand, if the equivalent ratio (NCO/OH) is 1 or more, it is impossible to obtain a compound (polyether polyurethane polyol) having hydroxyl groups at ends of a main chain thereof in an adequate amount.

In this regard, the equivalent ratio (NCO/OH) is preferably in the range of about 0.7 to 0.99, and more preferably in the range of about 0.8 to 0.95. This makes it possible to obtain a polyether polyurethane polyol capable of bonding the substrates together at excellent peeling strength just after lamination in an adequate amount. This also makes it possible to preferably prevent the obtained polyether polyurethane polyol from being gelated.

Either of a solution polymerization method and a bulk polymerization method may be used for reaction of the polyalkylene glycol and the alkane diol monomer with the organic diisocyanate. In the solution polymerization method, polymerization reaction is carried out in a state that the respective components are dissolved into an organic solvent such as ethyl acetate. In this case, a reaction temperature thereof is set to a lower temperature than a boiling point of the organic solvent. Further, in this case, since a concentration of reactive groups becomes low, a catalyst such as an organic tin compound is generally used. On the other hand, in the bulk polymerization method, polymerization reaction is carried out in a state that the respective components are not dissolved into the organic solvent. In this case, a reaction temperature thereof can be set to a relatively high temperature. Therefore, the polymerization reaction can be carried out in a short period of time without using the catalyst.

Further, the main agent also contains a bisphenol A-type epoxy resin being of a solid state or a semisolid state at normal temperature. Since the bisphenol A-type epoxy resin being of the solid state or the semisolid state at the normal temperature has high compatibility with respect to the polyether polyurethane polyol, it is easy to prepare a homogeneous adhesive agent composition. The polyether polyurethane polyol includes ether bonds in the structure thereof and thus has slightly high hydrophilicity, whereas the bisphenol A-type epoxy resin has a hydrophobic structure (skeleton). Therefore, by using them in combination, it is possible to suppress or prevent the adhesive agent composition or its cured product from being easily swelled due to moisture absorption thereof.

Here, in this specification, the "normal temperature" means 23° C. unless explicitly described otherwise. Further, the "bisphenol A-type epoxy resin being of the solid state or the semisolid state at the normal temperature" means a bisphenol A-type epoxy resin having a viscosity of 25 Pa·s or more at the normal temperature.

Further, a number average molecular weight of the bisphenol A-type epoxy resin is in the range of about 400 to 5,000. If the number average molecular weight is less than 400, since the bisphenol A-type epoxy resin is of a liquid state at the normal temperature, there is a fear that the cured product of the adhesive agent composition cannot have sufficiently improved water resistance and moist-heat resistance. On the other hand, if the number average molecular weight exceeds 5,000, there is a fear that flexibility of the adhesive agent composition is lowered. Further, in the case where a polyether polyurethane polyol having a high molecular weight is used, by combining it with a bisphenol A-type epoxy resin having a low molecular weight, it is possible to obtain an effect of improving ease of coating (coating adequacy) of the adhesive agent composition by lowering a viscosity thereof. However, if the number average molecular weight exceeds 5,000, the effect of lowering the viscosity of the adhesive agent composition becomes deteriorated.

In this regard, the number average molecular weight of the bisphenol A-type epoxy resin is preferably in the range of about 800 to 3,000. This makes it possible to adequately adjust the flexibility and viscosity of the adhesive agent composition, and to further improve the water resistance and moist-heat resistance of the cured product thereof.

An amount of the bisphenol A-type epoxy resin mixed (contained) in the adhesive agent composition is preferably 60 wt % or lower, and more preferably in the range of about 10 to 40 wt % with respect to all non-volatile components contained in the main agent. By setting the amount of the bisphenol A-type epoxy resin to 60 wt % or lower, it is possible to more adequately adjust the flexibility of the adhesive agent composition, and by setting the amount of the bisphenol A-type epoxy resin to about 10 to 40 wt %, it is possible to further enhance the bonding force of the adhesive agent composition.

Further, the main agent may contain well-known additives for an adhesive agent in addition to the polyether polyurethane polyol and the bisphenol A-type epoxy resin. Examples of such additives include a silane coupling agent, a reaction accelerator and the like.

In the case where the main agent contains the silane coupling agent, it is possible to improve a bonding force of the adhesive agent composition with respect to a substrate (e.g., a metal foil) composed of a metal material. Further, in the case where the main agent contains the reaction accelerator, it is possible to shorten an aging time of the adhesive agent composition (that is, a time to be required for curing the adhesive agent composition).

Examples of the silane coupling agent include: a trialkoxysilane having a vinyl group such as vinyl trimethoxysilane or vinyl triethoxysilane; a trialkoxysilane having an amino group such as 3-aminopropyl triethoxysilane or N-(2-aminoethyl) 3-aminopropyl trimethoxysilane; and a trialkoxysilane having a glycidyl group such as 3-glycidoxypropyl trimethoxysilane, 2-(3,4-epoxycyclohexyl) ethyl trimethoxysilane or 3-glycidoxypropyl triethoxysilane. One of them can be used alone or arbitrary two or more of them can be used in combination.

Further, an amount of the silane coupling agent mixed (contained) in the adhesive agent composition is preferably in the range of about 0.5 to 5 wt %, and more preferably in the range of about 1 to 3 wt % with respect to the all non-volatile components contained in the main agent. This makes it possible to further enhance the bonding force of the adhesive agent composition with respect to the substrate (e.g., the metal foil) composed of the metal material.

On the other hand, examples of the reaction accelerator include: a metal-type catalyst such as dibutyl tin diacetate, dibutyl tin dilaurate, dioctyl tin dilaurate or dibutyl tin dimalate; a tertiaryamine such as 1,8-diaza-bicyclo(5,4,0) undecene-7,1,5-diaza-bicyclo(4,3,0)nonene-5, or 6-dibutyl amino-1,8-diaza-bicyclo(5,4,0)undecene-7; a reactive tertiaryamine such as triethanolamine; and the like. One of them can be used alone or arbitrary two or more of them can be used in combination.

Even in the case where a laminated body, which is produced by using the adhesive agent composition of the present invention, is left under an environment having high humidity and high temperature (e.g., 85° C./85% RH) for a long period of time, it has a characteristic capable of keeping sufficient peeling strength. Here, it is known that a polyether polyurethane is generally discolored (changed into yellow) at a high temperature of 150° C. or higher. Therefore, in the present invention, it is preferred that the adhesive agent composition further contains a heat stabilizer. In this case, it is possible to prevent the polyether polyurethane polyol contained in the main agent from being discolored (changed into yellow) by being heated.

Examples of the heat stabilizer include a hindered phenol-type antioxidant, a phosphorus-type or hydroxyl amine-type thermal processing heat stabilizer, and the like. Among them, it is preferable to use the hindered phenol-type antioxidant. In this case, it is possible to more reliably prevent the polyether polyurethane polyol from being discolored (changed into yellow) by being heated.

Examples of the hindered phenol-type antioxidant include 2,4-dimethyl-6-t-butyl phenol, 2,6-di-t-butyl phenol, 2,6-di-t-butyl-p-cresol, hydroxymethyl-2,6-di-t-butyl phenol, 2,6-di-t-α-dimethyl amino-p-cresol, 2,5-di-t-butyl-4-ethyl phenol, 4,4'-bis(2,6-di-t-butyl phenol), 2,2'-methylene-bis-4-methyl-6-t-butyl phenol, 2,2'-methylene-bis(4-ethyl-6-t-butyl phenol), 4,4'-methylene-bis(6-t-butyl-o-cresol), 4,4'-methylene-bis(2,6-di-t-butyl phenol), 2,2'-methylene-bis(4-methyl-6-cyclohexyl phenol), 4,4'-butylidene-bis(3-methyl-6-t-butyl phenol), 4,4'-thiobis(6-t-butyl-3-methyl phenol), bis(3-methyl-4-hydroxy-5-t-butyl benzyl) sulfide, 4,4'-thiobis(6-t-butyl-o-cresol), 2,2'-thiobis(4-methyl-6-t-butyl phenol), 2,6-bis(2'-hydroxy-3'-t-butyl-5'-methylbenzyl)-4-methyl phenol, 3,5-di-t-butyl-4-hydroxybenzene sulfonic acid diethyl ester, 2,2'-dihydroxy-3,3'-di(α-methyl cyclohexyl)-5, 5'-dimethyl-diphenyl methane, α-octadecyl-3(3',5'-di-t-butyl-4'-hydroxyphenyl) propionate, 6-(hydroxy-3,5-di-t-butyl anilino)-2,4-bis-octyl-thio-1,3,5-triazine, hexamethylene glycol-bis[β-(3,5-di-t-butyl-4-hydroxyphenol) propionate], N,N'-hexamethylene-bis(3,5-di-t-butyl-4-hydroxyhydrocinnamic acid amide), 2,2-thio[diethyl-bis-3(3,5-di-t-butyl-4-hydroxyphenyl) propionate], 3,5-di-t-butyl-4-hydroxybenzene phosphonic acid dioctadecyl ester, tetrakis[methylene-3(3,5-di-t-butyl-4-hydroxyphenyl) propionate]methane, 1,3, 5-trimethyl-2,4,6-tris(3,5-di-t-butyl-4-hydroxybenzyl) benzene, 1,1,3-tris(2-methyl-4-hydroxy-5-di-t-butyl phenyl) butane, tris(3,5-di-t-butyl-4-hydroxyphenyl) isocyanurate, tris[β-(3,5-di-t-butyl-4-hydroxyphenyl) propionyl-oxyethyl] isocyanurate, and the like.

Among them, it is especially preferable to use a hindered phenol-type antioxidant having a molecular weight of 500 or more such as the tetrakis[methylene-3(3,5-di-t-butyl-4-hydroxyphenyl) propionate]methane.

An amount of the heat stabilizer mixed (contained) in the adhesive agent composition is preferably in the range of about 1 to 5 parts by weight with respect to 100 parts by weight of the all non-volatile components contained in the main agent. In this case, it is possible to further improve the effect of preventing the polyether polyurethane polyol from being discolored (changed into yellow) by being heated. In this regard, this heat stabilizer may be mixed in the main agent during preparation of the main agent.

Further, the main agent may contain a well-known wetting agent or defoaming agent. In the case where the main agent contains the wetting agent or defoaming agent, it is possible to improve appearance (laminated appearance) of a laminated body produced by using the adhesive agent composition.

Examples of the wetting agent include polyether-modified polydimethyl siloxane, polyester-modified polydimethyl siloxane, aralkyl-modified polymethyl alkyl siloxane, polyester-modified hydroxyl group-containing polydimethyl siloxane, polyether ester-modified hydroxyl group-containing polydimethyl siloxane, an acryl-based copolymer, a methacryl-based copolymer, polyether-modified polymethyl alkyl siloxane, an acrylic acid-alkyl ester copolymer, a methacrylic alkyl ester copolymer, lecithin and the like.

Further, examples of the defoaming agent include a well-known compound such as a silicone resin, a silicon solution and a copolymer of alkyl vinyl ether, acrylic acid alkyl ester and methacrylic acid alkyl ester.

Next, description will be made on a curing agent used in combination with the above mentioned main agent.

The curing agent may be any compound as long as it has a reactive functional group capable of reacting with a hydroxyl group or epoxy group of the compound contained in the main agent. Examples of this reactive functional group include a carboxyl group, an acid anhydride group, an isocyanate group and the like. Among them, the isocyanate group is preferable as the reactive functional group. This is because the isocyanate group can be reacted with the hydroxyl group at an especially fast reaction speed. Although a compound having the isocyanate group includes various kinds of compounds, a multifunctional polyisocyanate is especially preferable.

Examples of the multifunctional polyisocyanate include a low molecular weight polyisocyanate, a polyurethane isocyanate (adduct) obtained by reacting the low molecular weight polyisocyanate with water or polyalcohol, a biuret or allophanate of the polyurethane isocyanate, an uretdione (dimer) or isocyanurate (trimer) of the low molecular weight polyisocyanate, and the like. One of them can be used alone or arbitrary two or more of them can be used in combination.

Examples of the low molecular weight polyisocyanate include the same compounds exemplified as the organic diisocyanate. One of them can be used alone or arbitrary two or more of them can be used in combination. Examples of the polyalcohol to be reacted with the low molecular weight polyisocyanate for obtaining the polyurethane isocyanate (adduct) include a polyalcohol having 3 or more functional groups such as trimethylol propane or sorbitol, the alkane diol exemplified as the raw material for synthesizing the above polyether polyurethane polyol, and the like.

Here, the multifunctional polyisocyanate is roughly classified into an aromatic multifunctional polyisocyanate and an aliphatic or alicyclic multifunctional polyisocyanate, but it is preferable to use the aliphatic or alicyclic multifunctional polyisocyanate. Since the aliphatic or alicyclic multifunctional polyisocyanate has no aromatic ring in a structure thereof, it hardly forms a polymer (e.g., a dimer) even by being irradiated with light such as an ultraviolet ray. Therefore, even in the case where a laminated body produced by using the adhesive agent composition is left outdoors for a long period of time, it is possible to appropriately prevent the cured product of the adhesive agent composition from being discolored (changed into yellow).

Further, it is preferred that the multifunctional polyisocyanate contains at least a multifunctional polyisocyanate having an isocyanurate structure. The isocyanurate structure is a structure having high heat resistance and hydrophobicity. Therefore, by using such a multifunctional polyisocyanate as the curing agent, the cured product of the adhesive agent composition can exhibit moist-heat resistance for a longer period of time.

In this regard, an amount of the multifunctional polyisocyanate having the isocyanurate structure mixed (contained) in the curing agent is preferably in the range of about 50 to 100 wt %, and more preferably in the range of about 60 to 100 wt %. By setting the amount of the multifunctional polyisocyanate having the isocyanurate structure mixed in the curing agent within the above range, it is possible to further improve the moist-heat resistance of the cured product of the adhesive agent composition.

For these reasons, in the present invention, it is especially preferable to use a curing agent containing an aliphatic or alicyclic multifunctional polyisocyanate having an isocyanurate structure in an amount of 50 to 100 wt %.

In this regard, concrete examples of the multifunctional polyisocyanate having the isocyanurate structure include isocyanurate of 3-isocyanatomethyl-3,5,5-trimethyl cyclohexyl=isocyanate (hereinbelow, referred to as "isophorone diisocyanate") which is the alicyclic diisocyanate, isocyanurate of hexamethylene diisocyanate which is the aliphatic diisocyanate, and the like. These isocyanurates are preferable in that they can have long pot life (working life) after being mixed with the polyether polyurethane polyol and stability (solution stability) of the adhesive agent composition can be appropriately kept.

Among them, it is more preferable to use the isocyanurate of the isophorone diisocyanate. Such isocyanurate is preferable in that it has further high heat resistance.

Further, an amount of the curing agent mixed (contained) in the adhesive agent composition is preferably in the range of about 3 to 20 parts by weight, and more preferably in the range of about 7 to 18 parts by weight with respect to 100 parts by weight of the main agent. By setting the mixed amount of the curing agent with respect to the main agent within the above range, it is possible to improve the initial cohesion force of the adhesive agent composition. Further, even in the case where a laminated body produced by using the adhesive agent composition is left outdoors for a long period of time, it is possible to appropriately prevent the peeling strength of the cured product of the adhesive agent composition from being lowered.

The adhesive agent composition of the present invention can be also used as an organic solvent solution (vanish) by containing a well-known organic solvent therein. Examples of the organic solvent include, but are not limited to, an ester-based solvent such as ethyl acetate or butyl acetate, a ketone-based solvent such as methyl ethyl ketone, methyl isobutyl ketone or cyclohexanone, and the like. One of them can be used alone or arbitrary two or more of them can be used in combination.

In order to produce a laminated body by using the adhesive agent composition of the present invention, a well-known method can be used. For example, first, the adhesive agent composition is applied (supplied) onto one surface of one substrate (first substrate) by using a comma coater or dry laminator, and then the solvent is optionally removed therefrom. In this regard, an amount of the adhesive agent composition to be applied on the one surface is preferably in the range of about 1 to 50 $g/m^2$, and more preferably in the range of about 1 to 35 $g/m^2$ in a dry weight thereof. Next, the other substrate (second substrate) is laminated (bonded) to the one substrate through the adhesive agent composition, and then the adhesive agent composition is cured under room temperature or heated temperature. In this way, the two substrates are bonded together with a cured product of the adhesive agent composition, to thereby produce a laminated body of the present invention.

Further, the number of the substrates (members) can be arbitrarily set depending on the intended use of the laminated body. In the case where three or more substrates are laminated together, the adhesive agent composition of the present invention can be used for bonding all the substrates or a part of the substrates.

Examples of the one substrate include a liquid repellent substrate having a substituent group including a fluorine atom, that is, a substituent group with high liquid repellency on a surface thereof. A general adhesive agent (adhesive agent composition) has low affinity (wettability) with respect to such a liquid repellent substrate, and thus does not exhibit a high bonding force. On the other hand, in the adhesive agent composition of the present invention, the polyalkylene oxide chain derived from the polyalkylene glycol included in the polyether polyurethane polyol contributes improvement of the wettability of the polyether polyurethane polyol with respect to the liquid repellent substrate, and also has excellent hydrolyzability. Therefore, the cured product thereof can firmly bond the liquid repellent substrate to another substrate for a long period of time.

Examples of the substrate having the substituent group including the fluorine atom on the surface thereof include a substrate at least whose surface is constituted from a fluoro-based resin as a major component thereof (e.g., a substrate whose entirety is constituted from the fluoro-based resin as a major component thereof, a substrate obtained by coating a surface of a base substrate with a resin material containing the fluoro-based resin as a major component thereof), a substrate obtained by treating a surface of a base substrate constituted from a resin material with fluorine plasma, a substrate obtained by treating a surface of a base substrate constituted from a metal material with a treatment agent having a fluoroalkyl group (e.g., a coupling agent), and the like.

In this regard, examples of the fluoro-based resin include polyvinyl fluoride (hereinbelow, abbreviated to as "PVF"), polyvinylidene fluoride (hereinbelow, abbreviated to as "PVDF"), a perfluoroethylene-based copolymer (hereinbelow, abbreviated to as "ETFE"), polytetrafluorethylene (hereinbelow, abbreviated to as "PTFE"), a tetrafluoroethylene-hexafluoropropylene-based copolymer (hereinbelow, abbreviated to as "FEP"), and the like.

On the other hand, examples of the other substrate (second substrate) include a substrate constituted from at least one of a resin material and a metal material. Further, examples of the resin material include a fluoro-based resin, an olefin such as PET (polyethylene terephthalate), PEN (polyethylene naphthalate) or polypropylene and the like, whereas examples of the metal material include aluminum, copper, iron, an alloy containing them (e.g., stainless steel) and the like. Especially, the other substrate is preferably constituted from the fluoro-based resin as a major component thereof.

Although it is very difficult to bond the substrate constituted from these materials to another substrate with the general adhesive agent composition, the adhesive agent composition of the present invention can appropriately bond these substrates together. Further, the adhesive agent composition of the present invention can also bond even a resin substrate whose surface is not subjected to a treatment for improving adhesiveness (that is, an untreated resin substrate) appropriately.

A shape of each of the substrates (first substrate and second substrate) may be any shape such as a plate-like shape or a film-like shape (sheet-like shape). When the films are laminated together to obtain a laminated film and then the laminated film is rolled up just after lamination, positional difference between the films often becomes a problem. However, since the adhesive agent composition of the present invention has an appropriate initial cohesion force, such a problem can be resolved. In other words, the adhesive agent composition of the present invention can be more preferably used for bonding the films together.

As described above, the adhesive agent composition of the present invention is suitable as a laminate adhesive agent used for, for example, bonding films each formed of a fluoro-based resin as a major component thereof together or bonding such a film and another film formed of a resin material or a metal material as a major component thereof together.

Next, the present invention will be more specifically described based on Examples and Comparative examples.

EXAMPLES

Hereinbelow, the present invention will be concretely described based on Examples, but is not limited to these Examples. In this regard, it is to be noted that "parts" and "%" shown in Examples and Comparative Examples mean "parts by weight" and "wt %", respectively, unless explicitly described otherwise.

Synthetic Example 1

Synthesis of Polyol A 73.92 parts of polytetramethylene glycol having a number average molecular weight of 650 ("PTG650SN" produced by HODOGAYA CHEMICAL Co. Ltd., hereinbelow, abbreviated to as "PTMG650"), 1.16 parts of 1,6-hexane diol (hereinbelow, abbreviated to as "1,6-HD"), 24.92 parts of isophorone diisocyanate (hereinbelow, abbreviated to as "IPDI") were put into a synthetic container with a mixer so that an equivalence ratio (NCO/OH) became 0.91, and then reacted with each other at 170° C. for 2 hours, to thereby synthesize a polyol A.

In this regard, this obtained polyol A had OH groups at ends of a main chain thereof, a weight average molecular weight of 38,000 and an urethane bond equivalent of 424 g/eq.

Next, 100 parts of ethyl acetate was added to this polyol A so that non-volatile components became 50%, to thereby prepare a solution of the polyol A.

Synthetic Examples 2 to 14

Synthesis of Polyols B to N

Polyols B to N were synthesized, and then solutions of the polyols B to N were prepared in the same manner as the synthetic example 1, except that the raw materials and the mixed amounts thereof were changed as shown in Table 1. In this regard, the raw materials used for synthesis were as follows.

PTMG1000: Polytetramethylene glycol having a number average molecular weight of 1,000 ("PTG1000SN" produced by HODOGAYA CHEMICAL Co. Ltd.)

PTMG2000: Polytetramethylene glycol having a number average molecular weight of 2,000 ("PTG2000SN" produced by HODOGAYA CHEMICAL Co. Ltd.)

PTMG3000: Polytetramethylene glycol having a number average molecular weight of 3,000 ("PTG3000SN" produced by HODOGAYA CHEMICAL Co. Ltd.)

IPDI: Isophorone diisocyanate

EG: Ethylene glycol 1,6-HD: 1,6-hexane diol

MPD: 3-methyl-1,5-pentane diol 1,9-ND: 1,9-nonane diol

PMPA: Poly 3-methyl-1,5-pentane adipate polyol having a number average molecular weight of 2,000 ("kurapol P2010" produced by KURARAY CO., LTD.)

Synthetic Example 15

Synthesis of Polyol Q 74.03 parts of PTMG650 ("PTG650SN"), 25 parts of ethyl acetate, 25.97 parts of diphenyl methane diisocyanate ("SBU isocyanate H772" produced by Sumitomo Bayer Urethane Co. Ltd., hereinbelow abbreviated to as "MDI") were put into a synthetic container with a mixer so that an equivalence ratio (NCO/OH) became 0.92, 0.001 parts of dioctyl tin laurate ("NEOSTANN U810" produced by NITTO KASEI CO., LTD.) was added thereto, and then reacted with each other at 95° C. for 2 hours, to thereby synthesize a polyol Q.

In this regard, this obtained polyol Q had OH groups at ends of a main chain thereof, a weight average molecular weight of 37,000 and an urethane bond equivalent of 462 g/eq.

Next, 75 parts of ethyl acetate was added to this polyol Q so that non-volatile components became 50%, to thereby prepare a solution of the polyol Q.

Synthetic Examples 16 to 20

Synthesis of Polyols R to V

Polyols R to V were synthesized, and then solutions of the polyols R to V were prepared in the same manner as the synthetic example 15, except that the raw materials and the mixed amounts thereof were changed as shown in Table 1. In this regard, the raw materials used for synthesis other than the raw materials used in the synthetic examples 1 to 14 were as follows.

PPG2000-EO: Ethylene oxide (EO)-end modified polypropylene glycol having a number average molecular weight of 2,000 ("EXCENOL 540" produced by ASAHI GLASS CO., LTD.)

PTMG850: Polytetramethylene glycol having a number average molecular weight of 850 ("PTG850SN" produced by HODOGAYA CHEMICAL Co. Ltd.)

MPO: 2-methyl-1,3-pentane diol

NPG: Neopentyl glycol

BEPG: 2-butyl-2-ethyl-1,3-propane diol

Hydrogenated XDI: Hydrogenated xylylene diisocyanate

Hydrogenated MDI: Hydrogenated diphenyl methane diisocyanate

HDI: 1,6-hexamethylene diisocyanate

MDI: Diphenyl methane diisocyanate

TDI: Tolylene diisocyanate

DOTDL: Dioctyl tin laurate

TABLE 1

| | Synthetic example | | | | | | | | | | |
|---|---|---|---|---|---|---|---|---|---|---|---|
| | 1 | 2 | 3 | 4 | 5 | 6 | 7 | 8 | 9 | 10 | 11 |
| Polyol | A | B | C | D | E | F | G | H | I | J | k |
| PPG2000-EO | | | | | | | | | | | |
| PTMG650 | 73.92 | | | | | | | | | | |
| PTMG850 | | | | | | | | | | | |
| PTMG1000 | | 70.62 | | | | | | | | | |
| PTMG2000 | | | 67.79 | | 65.63 | 72.09 | 74.54 | 53.12 | 67.29 | 90.63 | 79.14 |
| PTMG3000 | | | | 66.90 | | | | | | | |
| PMPA | | | | | | | | | | | |
| MPO | | | | | | | | | | | |
| MPD | | | | | | | 6.61 | 15.44 | | | 4.68 |
| 1,6-HD | 1.16 | 5.57 | 9.35 | 10.54 | | | | | 9.28 | | |
| NPG | | | | | | | | | | | |
| BEPG | | | | | | | | | | | |
| 1,9-ND | | | | | 12.25 | | | | | | |
| EG | | | | | | 5.21 | | | | | |
| IPDI | 24.92 | 23.81 | 22.86 | 22.56 | 22.12 | 22.70 | 18.85 | 31.44 | 23.43 | 9.37 | 16.18 |
| Hydrogenated XDI | | | | | | | | | | | |
| Hydrogenated MDI | | | | | | | | | | | |
| HDI | | | | | | | | | | | |
| MDI | | | | | | | | | | | |
| TDI | | | | | | | | | | | |
| Ethyl acetate | 100.00 | 100.00 | 100.00 | 100.00 | 100.00 | 100.00 | 100.00 | 100.00 | 100.00 | 100.00 | 100.00 |
| NCO/OH | 0.91 | 0.91 | 0.91 | 0.91 | 0.91 | 0.85 | 0.91 | 0.90 | 0.94 | 0.93 | 0.92 |
| Non-volatile components | 50 | 50 | 50 | 50 | 50 | 50 | 50 | 50 | 50 | 50 | 50 |
| Weight average molecular weight (Mw) | 38000 | 36000 | 37000 | 37000 | 37000 | 35000 | 40000 | 35000 | 65000 | 40000 | 40000 |
| Number average molecular weight (Mn) | 19000 | 17000 | 17000 | 17000 | 17000 | 17000 | 19000 | 17000 | 30000 | 20000 | 20000 |
| Polydispersity (Mw/Mn) | 2.0 | 2.1 | 2.2 | 2.2 | 2.2 | 2.1 | 2.1 | 2.1 | 2.2 | 2.0 | 2.0 |
| Urethane bond equivalent | 424 | 445 | 463 | 470 | 479 | 450 | 562 | 335 | 460 | 1143 | 658 |

| | Synthetic example | | | | | | | | |
|---|---|---|---|---|---|---|---|---|---|
| | 12 | 13 | 14 | 15 | 16 | 17 | 18 | 19 | 20 |
| Polyol | L | M | N | Q | R | S | T | U | V |
| PPG2000-EO | | | | | 65.64 | | | | |
| PTMG650 | | | | 74.03 | | | | 67.39 | |
| PTMG850 | | | | | | | | | 79.76 |
| PTMG1000 | | | | | | | | | |
| PTMG2000 | 48.88 | 73.52 | | | | 67.59 | 69.87 | | |
| PTMG3000 | | | | | | | | | |
| PMPA | | | 67.79 | | | | | | |
| MPO | | | | | | 9.71 | | | |
| MPD | 17.17 | | 9.35 | | 9.23 | | 9.69 | 2.31 | |
| 1,6-HD | | 10.14 | | | | | | | |
| NPG | | | | | | | | | |
| BEPG | | | | | | | | | 3.06 |
| 1,9-ND | | | | | | | | | |
| EG | | | | | | | | | |
| IPDI | 33.95 | 16.34 | 22.86 | | | | | | |
| Hydrogenated XDI | | | | | | | 20.44 | | |
| Hydrogenated MDI | | | | | | | | 30.30 | |
| HDI | | | | | | | | | 17.18 |
| MDI | | | | 25.97 | 25.13 | | | | |
| TDI | | | | | | 22.70 | | | |
| Ethyl acetate | 100.00 | 100.00 | 100.00 | 100.00 | 100.00 | 100.00 | 100.00 | 100.00 | 100.00 |
| NCO/OH | 0.90 | 0.60 | 0.91 | 0.92 | 0.92 | 0.92 | 0.91 | 0.90 | 0.91 |
| Non-volatile components | 50 | 50 | 50 | 50 | 50 | 50 | 50 | 50 | 50 |
| Weight average molecular weight (Mw) | 34000 | 16000 | 37000 | 37000 | 38000 | 35000 | 34000 | 35000 | 32000 |

TABLE 1-continued

| | | | | | | | | | |
|---|---|---|---|---|---|---|---|---|---|
| Number average molecular weight (Mn) | 16000 | 8000 | 17000 | 18000 | 16000 | 17000 | 18000 | 19000 | 13000 |
| Polydispersity (Mw/Mn) | 2.1 | 2.0 | 2.2 | 2.1 | 2.4 | 2.1 | 1.9 | 1.8 | 2.5 |
| Urethane bond equivalent | 310 | 510 | 463 | 462 | 470 | 377 | 450 | 410 | 470 |

Synthetic Example 21

Synthesis of Polyol O 59.8 parts of dimethyl terephthalate, 92.2 parts of ethylene glycol, 72.2 parts of neopentyl glycol and 0.02 parts of zinc acetate were put into a reaction can, and then heated at 160 to 210° C. under a nitrogen stream while being stirred, to thereby carry out ester exchange reaction. When a 97% stoichiometric amount of methanol was distilled, 46.5 parts of isophthalic acid and 233.7 parts of azelaic acid were further added into the reaction can, and then heated at 160 to 270° C., to thereby react them with each other.

Thereafter, an internal pressure of the reaction can was gradually decompressed down to 1 to 2 Torrs, and then the reaction under the decompression was stopped when an acid value became 0.8 mgKOH/g or lower. In this way, polyester polyol having a weight average molecular weight of 80,000 was obtained as a polyol O.

Next, this polyol O was diluted with ethyl acetate so that non-volatile components became 50%, to thereby prepare a solution of the polyol O.

Synthetic Example 22

Synthesis of Polyol P 66.95 parts of PTMG2000 ("PTG2000SN"), 9.23 parts of 1,6-HD and 23.81 parts of IPDI were put into a synthetic container with a mixer so that an equivalence ratio (NCO/OH) became 0.96, and then reacted with each other at 170° C. for 2 hours, to thereby synthesize a polyol P.

In this regard, this obtained polyol P had OH groups at ends of a main chain thereof, a weight average molecular weight of 72,000 and an urethane bond equivalent of 458 g/eq.

Next, 100 parts of ethyl acetate was added to this polyol P so that non-volatile components became 50%, to thereby prepare a solution of the polyol P.

The polyol N is a polyester polyurethane polyol and the polyol O is a polyester polyol. Further, the polyol P is also the polyether polyurethane polyol. However, since the polyol P had a high viscosity in synthesis and thus was not suitable for practical use, it was not used for producing a laminated body.

Therefore, in these Examples, main agents were prepared by using the solutions of the polyols A to V other than the solution of the polyol P.

<Preparation of Main Agent 1>

140 parts of the solution of the polyol P, 30 parts of a bisphenol A-type epoxy having a melting point of 78° C. and a number average molecular weight of 1,200 and being of a solid state at normal temperature ("YD-012" produced by Tohto Kasei Co., Ltd.) and 3 parts of an epoxy group-containing organosilane coupling agent ("KBE403" produced by Shin-Etsu Chemical Co., Ltd., the same will apply hereinbelow) were mixed with each other. Thereafter, 3 parts of a heat stabilizer ("IRGANOX 1010" produced by BASF, the same will apply hereinbelow) was further added thereto, and then dissolved by mixing and heating them at 70° C., to thereby obtain a dissolved product. Next, ethyl acetate was added to this dissolved product so that non-volatile components became 50%, to thereby obtain a main agent 1.

<Preparation of Main Agents 2 to 28>

Main agents 2 to 28 were prepared in the same manner as the main agent 1, except that the mixed amounts were changed as shown in Table 2.

In this regard, a bisphenol A-type epoxy resin having a number average molecular weight of 470 ("jER834" produced Mitsubishi Chemical Corporation) was used as the bisphenol A-type epoxy resin being of the semisolid state at the normal temperature shown in Table 2, and a bisphenol A-type epoxy resin having a number average molecular weight of 370 ("jER828" produced by Mitsubishi Chemical Corporation) was used as the bisphenol A-type epoxy resin being of the liquid state at the normal temperature shown in Table 2, respectively.

Here, the bisphenol A-type epoxy resin being of the semisolid state at the normal temperature had a viscosity (normal temperature) of 25 Pa·s or more.

The bisphenol A-type epoxy resin being of the semisolid state at the normal temperature was used in the main agent 17, and the bisphenol A-type epoxy resin being of the liquid state at the normal temperature was used in the main agent 18. Further, the main agent 19 did not contain the bisphenol A-type epoxy resin, and the main agent 20 did not contain the heat stabilizer.

<Preparation of Curing Agent 1>

Isocyanurate of isophorone diisocyanate was diluted with ethyl acetate so that non-volatile components became 50%, to thereby prepare a curing agent 1. Namely, in the curing agent 1, used was a multifunctional polyisocyanate containing the multifunctional polyisocyanate having the isocyanurate structure in an amount of 100%.

<Preparation of Curing Agent 2>

An adduct of hexamethylene diisocyanate and trimethylol propane was diluted with ethyl acetate so that non-volatile components became 50%, to thereby prepare a curing agent 2. Namely, in the curing agent 2, used was a multifunctional polyisocyanate containing no multifunctional polyisocyanate having the isocyanurate structure.

<Preparation of Curing Agent 3>

60 parts of the curing agent 1 and 40 parts of the curing agent 2 were mixed with each other at 70° C., and then diluted with ethyl acetate so that non-volatile components became 50%, to thereby prepare a curing agent 3. Namely, in the curing agent 3, used was a multifunctional polyisocyanate containing the multifunctional polyisocyanate having the isocyanurate structure in an amount of 60%.

<Preparation of Curing Agent 4>

An adduct of 2,6-tolylene diisocyanate and trimethylol propane was diluted with ethyl acetate so that non-volatile components became 50%, to thereby prepare a curing agent 4. Namely, in the curing agent 4, used was an aromatic multifunctional polyisocyanate containing no multifunctional polyisocyanate having the isocyanurate structure.

TABLE 2

| | | | Bisphenol A-type epoxy resin | | | | | |
|---|---|---|---|---|---|---|---|---|
| | Solution of polyol | | Solid state at normal temperature | Semisolid state at normal temperature | Liquid state at normal temperature | Silane coupling agent | Heat stabilizer | Ethyl acetate |
| | Polyol | Mixed amount | | | | | | |
| Main agent 1 | A | 140 | 30 | | | 3 | 3 | 36 |
| Main agent 2 | B | 140 | 30 | | | 3 | 3 | 36 |
| Main agent 3 | C | 140 | 30 | | | 3 | 3 | 36 |
| Main agent 4 | D | 140 | 30 | | | 3 | 3 | 36 |
| Main agent 5 | E | 140 | 30 | | | 3 | 3 | 36 |
| Main agent 6 | F | 140 | 30 | | | 3 | 3 | 36 |
| Main agent 7 | G | 140 | 30 | | | 3 | 3 | 36 |
| Main agent 8 | H | 140 | 30 | | | 3 | 3 | 36 |
| Main agent 9 | I | 140 | 30 | | | 3 | 3 | 36 |
| Main agent 10 | J | 140 | 30 | | | 3 | 3 | 36 |
| Main agent 11 | K | 140 | 30 | | | 3 | 3 | 36 |
| Main agent 12 | L | 140 | 30 | | | 3 | 3 | 36 |
| Main agent 13 | M | 140 | 30 | | | 3 | 3 | 36 |
| Main agent 14 | N | 140 | 30 | | | 3 | 3 | 36 |
| Main agent 15 | O | 140 | 30 | | | 3 | 3 | 36 |
| Main agent 16 | B | 180 | 10 | | | 3 | 3 | 16 |
| Main agent 17 | B | 140 | | 30 | | 3 | 3 | 36 |
| Main agent 18 | B | 140 | | | 30 | 3 | 3 | 36 |
| Main agent 19 | B | 200 | | | | 3 | 3 | 6 |
| Main agent 20 | B | 140 | 30 | | | 3 | | 33 |
| Main agent 21 | B | 140 | 30 | | | 3 | 1 | 34 |
| Main agent 22 | B | 140 | 30 | | | 3 | 5 | 38 |
| Main agent 23 | Q | 140 | 30 | | | 3 | 3 | 36 |
| Main agent 24 | R | 140 | 30 | | | 3 | 3 | 36 |
| Main agent 25 | S | 140 | 30 | | | 3 | 3 | 36 |
| Main agent 26 | T | 140 | 30 | | | 3 | 3 | 36 |
| Main agent 27 | U | 140 | 30 | | | 3 | 3 | 36 |
| Main agent 28 | V | 140 | 30 | | | 3 | 3 | 36 |

Examples 1 to 22, Comparative Examples 1 to 9

Adhesive agent solutions (adhesive agent compositions) each having a constitution shown in Table 3 were prepared, and then the following performance tests were carried out. These results are indicated in Table 3. In this regard, the mark "z" shown in Table 3 means that zipping occurs during peeling.

First, each adhesive agent solution was applied onto an untreated surface of a PET (polyethylene terephthalate) sheet having a thickness of 50 μm ("E5100" produced by TOYOBO CO., LTD., the same will apply hereinbelow) at an application quantity of 4 to 5 g/m²·dry, and then dried to remove a solvent therefrom. Next, a corona-treated surface of a PET sheet was bonded to a dried product of the adhesive agent solution under the lamination conditions of 60° C. and 0.5 MPa, to thereby obtain a sample (laminated body).

<Evaluation of Peeling Strength Just after Lamination>

The sample before aging, that is, the sample just after lamination was cut into 5 test pieces each having a size of 200 mm×15 mm, and then each test piece was subjected to a T-type peeling test under the atmosphere having 23° C. at a loading speed of 300 mm/min by using a tension tester according to the test defined in ASTM D1876-61. In this regard, "just after lamination" means a time of 10 minutes or less after the completion of the sample.

Thereafter, peeling strength (N/15 mm width) between the PET sheets is indicated as an average value of the 5 test pieces.

(Evaluation Criteria)
(A): 2 N/15 mm or more
(Completely all right in case of practical use)
(B): 1 to 2 N/15 mm
(All right in case of practical use)
(C): 0.5 to 1 N/15 mm
(Approximately all right in case of practical use)
(D): less than 0.5 N/15 mm
(Not all right in case of practical use)

<Evaluation of Peeling Strength Under Heat Condition>

The obtained sample was subjected to an aging treatment at 40° C. for 120 hours and cut into 5 test pieces each having a size of 200 mm×15 mm, and then each test piece was subjected to a T-type peeling test under the atmosphere having 135° C. at a loading speed of 300 mm/min by using a tension tester according to the test defined in ASTM D1876-61.

Thereafter, peeling strength (N/15 mm width) between the PET sheets is indicated as an average value of the 5 test pieces.

(Evaluation Criteria)
(A): 2 N/15 mm or more
(Completely all right in case of practical use)
(B): 1 to 2 N/15 mm
(All right in case of practical use)
(C): 0.5 to 1 N/15 mm
(Approximately all right in case of practical use)
(D): less than 0.5 N/15 mm
(Not all right in case of practical use)

<Evaluation of Moist-Heat Resistance>

The sample, which was subjected to an aging treatment at 40° C. for 120 hours, was put into a glass bottle, and then dipped in a distilled water by pouring it into the glass bottle. Thereafter, the glass bottle was sealed, and such a sealed state of the glass bottle was kept for 1 to 2 months. After 1 month and 2 months lapsed, respectively, the sample was ejected from the glass bottle, and then cut into 5 test pieces each having a size of 200 mm×15 mm. Next, these test pieces were dried at room temperature for 6 hours, and then each test piece was subjected to a T-type peeling test under the atmosphere having 23° C. at a loading speed of 300 mm/min by using a tension tester according to the test defined in ASTM D1876-61.

Thereafter, peeling strength (N/15 mm width) between the PET sheets is indicated as an average value of the 5 test pieces.

(Evaluation Criteria)
 (A): 5 N/15 mm or more
 (Completely all right in case of practical use)
 (B): 4 to 5 N/15 mm
 (All right in case of practical use)
 (C): 2 to 4 N/15 mm
 (Approximately all right in case of practical use)
 (D): less than 2 N/15 mm
 (Not all right in case of practical use)

Examples 23 to 34, Comparative Examples 10 and 11

Adhesive agent solutions (adhesive agent compositions) each having a constitution shown in Table 4 were prepared, and then the following performance test was carried out. These results are indicated in Table 4. In this regard, the mark "z" shown in Table 4 means that zipping occurs during peeling.

First, each adhesive agent solution was applied onto a corona-treated surface of a polyvinyl fluoride (PVF) sheet having a thickness of 50 μm ("Tedlar" produced by Du Pont Kabushiki Kaisha, the same will apply hereinbelow) at an application quantity of 4 to 5 $g/m^2$·dry, and then dried to remove a solvent therefrom. Next, a corona-treated surface of a PVF sheet was bonded to a dried product of the adhesive agent solution under the lamination conditions of 60° C. and 0.5 MPa, to thereby obtain a sample (laminated body). Thereafter, this sample was subjected to an aging treatment at 40° C. for 120 hours, and then tested.

Further, likewise, each adhesive agent solution was applied onto a corona-treated surface of an ethylene tetrafluoroethylene (ETFE) sheet having a thickness of 50 μm ("AFLEX50NS" produced by ASAHI GLASS CO., LTD., the same will apply hereinbelow) at an application quantity of 4 to 5 $g/m^2$·dry, and then dried to remove a solvent therefrom. Next, a corona-treated surface of an ETFE sheet was bonded to a dried product of the adhesive agent solution under the lamination conditions of 60° C. and 0.5 MPa, to thereby obtain a sample (laminated body). Thereafter, this sample was subjected to an aging treatment at 40° C. for 120 hours, and then tested.

<Evaluation of Moist-Heat Resistance>

The sample subjected to the aging treatment was put into a glass bottle, and then dipped in a distilled water by pouring it into the glass bottle. Thereafter, the glass bottle was sealed, and such a sealed state of the glass bottle was kept at 85° C. for 1 to 3 months. After 1 month and 3 months lapsed, respectively, the sample was ejected from the glass bottle, and then cut into 5 test pieces each having a size of 200 mm×15 mm. Next, these test pieces were dried at room temperature for 6 hours, and then each test piece was subjected to a T-type peeling test under the atmosphere having 23° C. at a loading speed of 300 mm/min by using a tension tester according to the test defined in ASTM D1876-61.

Thereafter, peeling strength (N/15 mm width) between the PVF sheets or peeling strength (N/15 mm width) between the ETFE sheets is indicated as an average value of the 5 test pieces.

(Evaluation Criteria)
 (A): 5 N/15 mm or more
 (Completely all right in case of practical use)
 (B): 4 to 5 N/15 mm
 (All right in case of practical use)
 (C): 2 to 4 N/15 mm
 (Approximately all right in case of practical use)
 (D): less than 2 N/15 mm
 (Not all right in case of practical use)

Example 35, Comparative Examples 12 and 13

Adhesive agent solutions (adhesive agent compositions) each having a constitution shown in Table 5 were prepared, and then the following performance test was carried out. These results are indicated in Table 5.

First, each adhesive agent solution was applied onto a corona-treated surface of a PVF sheet having a thickness of 50 μm at an application quantity of 4 to 5 $g/m^2$·dry, and then dried to remove a solvent therefrom. Next, a corona-treated surface of a PET sheet having a thickness of 50 μm was bonded to a dried product of the adhesive agent solution under the lamination conditions of 60° C. and 0.5 MPa, to thereby obtain a sample (laminated body). Thereafter, this sample was subjected to an aging treatment at 40° C. for 120 hours, and then tested.

Further, likewise, each adhesive agent solution was applied onto a corona-treated surface of a PVF sheet having a thickness of 50 μm at an application quantity of 4 to 5 $g/m^2$·dry, and then dried to remove a solvent therefrom. Next, an aluminum foil having a thickness of 50 μm was bonded to a dried product of the adhesive agent solution under the lamination conditions of 60° C. and 0.5 MPa, to thereby obtain a sample (laminated body). Thereafter, this sample was subjected to an aging treatment at 40° C. for 120 hours, and then tested.

<Evaluation of Moist-Heat Resistance>

The sample subjected to the aging treatment was put into a glass bottle, and then dipped in a distilled water by pouring it into the glass bottle. Therefore, the glass bottle was sealed, and such a sealed state of the glass bottle was kept at 85° C. for 1 to 3 months. After 1 month and 3 months lapsed, respectively, the sample was ejected from the glass bottle, and then cut into 5 test pieces each having a size of 200 mm×15 mm. Next, these test pieces were dried at room temperature for 6 hours, and then each test piece was subjected to a T-type peeling test under the atmosphere having 23° C. at a loading speed of 300 mm/min by using a tension tester according to the test defined in ASTM D1876-61.

Thereafter, peeling strength (N/15 mm width) between the PVF sheet and the PET sheet or peeling strength (N/15 mm width) between the PVF sheet and the aluminum foil is indicated as an average value of the 5 test pieces.

(Evaluation Criteria)
 (A): 5 N/15 mm or more
 (Completely all right in case of practical use)
 (B): 4 to 5 N/15 mm
 (All right in case of practical use)
 (C): 2 to 4 N/15 mm
 (Approximately all right in case of practical use)
 (D): less than 2 N/15 mm
 (Not all right in case of practical use)

Examples 36 to 39

Adhesive agent solutions (adhesive agent compositions) each having a constitution shown in Table 6 were prepared, and then the following performance test was carried out. These results are indicated in Table 6.

First, each adhesive agent solution was applied onto a white PET sheet having a thickness of 50 μm ("K1212" produced by TOYOBO CO., LTD.) at an application quantity of 10 g/m2·dry, and then dried to remove a solvent therefrom. Next, a corona-treated surface of a PET sheet having a thickness of 50 μm was bonded to a dried product of the adhesive agent solution under the lamination conditions of 60° C. and 0.5 MPa, to thereby obtain a sample (laminated body). Thereafter, this sample was subjected to an aging treatment at 40° C. for 120 hours, and then tested.

<Evaluation of Discoloration after Heating>

The sample subjected to the aging treatment was left into an oven keeping 150° C. for 3 days, and then a Δb value of the cured product of the adhesive agent composition was measured by using a color measuring machine ("X-rite 500 series" produced by nihonheihankizai co., ltd.). Thereafter, a degree of discoloration was evaluated.

(Evaluation Criteria)

(A): 2 or less
(Completely all right in case of practical use)
(B): 2 to 5
(All right in case of practical use)
(C): 5 to 10
(Approximately all right in case of practical use)
(D): 10 or more
(Not all right in case of practical use)

TABLE 3

| | | | | | | Evaluation result | | | | |
|---|---|---|---|---|---|---|---|---|---|---|
| | | | Main agent/ Curing agent | Urethane bond | Peeling strength just after | Peeling strength Under heat | Moist-heat resistance PET untreated surface/PET corona-treated surface (N/15 mm) | | | |
| | Main agent | Polyol | Curing agent | (weight ratio) | equivalent of Polyol (g/eq) | lamination (N/15 mm) | condition (N/15 mm) | Initial | After 1 month | After 2 months |
| Ex. 1 | 1 | A | 1 | 100/14 | 424 | 3.9 (A) | 0.8 (C) | 5.5 (A) | 4.4 (B) | 4.1 (B) |
| Ex. 2 | 2 | B | 1 | 100/14 | 445 | 4.2 (A) | 1.2 (B) | 5.2 (A) | 5.3 (A) | 4.8 (B) |
| Ex. 3 | 3 | C | 1 | 100/14 | 463 | 3.9 (A) | 1.2 (B) | 5.3 (A) | 5.5 (A) | 4.7 (B) |
| Ex. 4 | 4 | D | 1 | 100/14 | 470 | 3.3 (A) | 1.3 (B) | 4.7 (B) | 4.5 (B) | 4.1 (B) |
| Ex. 5 | 5 | E | 1 | 100/14 | 479 | 2.8 (A) | 0.9 (C) | 5.0 (A) | 4.8 (B) | 4.2 (B) |
| Ex. 6 | 6 | F | 1 | 100/14 | 450 | 3.1 (A) | 1.5 (B) | 5.3 (A) | 5.5 (A) | 4.7 (B) |
| Ex. 7 | 7 | G | 1 | 100/14 | 562 | 0.8 (C) | 1.0 (B) | 4.4 (B) | 5.0 (A) | 4.2 (B) |
| Ex. 8 | 8 | H | 1 | 100/14 | 335 | 4.1 (A) | 1.4 (B) | 5.3 (A) | 5.5 (A) | 4.7 (B) |
| Ex. 9 | 16 | B | 1 | 100/14 | 445 | 2.9 (A) | 1.0 (B) | 4.8 (B) | 4.1 (B) | 3.2 (C) |
| Ex. 10 | 17 | B | 1 | 100/14 | 445 | 2.1 (A) | 0.5 (C) | 4.2 (B) | 3.7 (C) | 2.7 (C) |
| Ex. 11 | 2 | B | 3 | 100/14 | 445 | 2.8 (A) | 0.6 (C) | 4.7 (B) | 4.2 (B) | 3.7 (C) |
| Ex. 12 | 9 | I | 1 | 100/14 | 460 | 4.5 (A) | 1.7 (B) | 5.5 (A) | 5.3 (A) | 4.5 (B) |
| Ex. 13 | 20 | B | 1 | 100/14 | 445 | 3.9 (A) | 1.0 (B) | 5.5 (A) | 5.1 (A) | 4.7 (B) |
| Ex. 14 | 24 | R | 1 | 100/14 | 470 | 3.9 (A) | 1.6 (B) | 5.5 (A) | 3.9 (C) | 3.2 (C) |
| Ex. 15 | 25 | S | 1 | 100/14 | 377 | 4.1 (A) | 1.5 (B) | 5.7 (A) | 5.1 (A) | 4.5 (B) |
| Ex. 16 | 26 | T | 1 | 100/14 | 450 | 3.5 (A) | 1.1 (B) | 4.9 (B) | 4.4 (B) | 4.1 (B) |
| Ex. 17 | 27 | U | 1 | 100/14 | 410 | 2.4 (A) | 1.4 (B) | 4.8 (B) | 4.7 (B) | 4.4 (B) |
| Ex. 18 | 28 | V | 1 | 100/14 | 470 | 1.5 (B) | 0.7 (C) | 4.2 (B) | 3.5 (C) | 2.2 (C) |
| Ex. 19 | 2 | B | 4 | 100/14 | 445 | 4.1 (A) | 1.6 (B) | 4.5 (A) | 3.1 (C) | 2.5 (C) |
| Ex. 20 | 2 | B | 1 | 100/7 | 445 | 4.2 (A) | 0.5 (C) | 5.5 (A) | 3.1 (C) | 2.1 (C) |
| Ex. 21 | 2 | B | 1 | 100/18 | 445 | 4.2 (A) | 1.2 (B) | 4.1 (B) | 5.3 (A) | 5.2 (A) |
| Ex. 22 | 2 | B | 2 | 100/14 | 445 | 2.9 (A) | 0.2 (D) | 4.2 (B) | 3.7 (C) | 3.1 (C) |
| Com. Ex. 1 | 10 | J | 1 | 100/14 | 1143 | 0.1 (D) | 1.0 (B) | 5.5 (A) | 4.7 (B) | 2.2 (C) |
| Com. Ex. 2 | 11 | K | 1 | 100/14 | 658 | 0.2 (D) | 1.1 (B) | 5.2 (A) | 4.5 (B) | 3.2 (C) |
| Com. Ex. 3 | 12 | L | 1 | 100/14 | 310 | 0.1-0.5(z) (D) | 1.4 (B) | 2.2-4.5(z) (D) | 0.7-3.1(z) (D) | 0.1-0.2(z) (D) |
| Com. Ex. 4 | 13 | M | 1 | 100/14 | 510 | 0.3 (D) | 0.4 (D) | 4.7 (B) | 4.5 (B) | 4.1 (B) |
| Com. Ex. 5 | 18 | B | 1 | 100/14 | 445 | 1.2 (B) | 0.1 (D) | 3.8 (C) | 2.1 (C) | 1.2 (D) |
| Com. Ex. 6 | 19 | B | 1 | 100/14 | 445 | 1.8 (B) | 0.4 (D) | 3.1 (C) | 2.5 (C) | 1.8 (D) |
| Com. Ex. 7 | 14 | N | 1 | 100/14 | 463 | 3.2 (A) | 1.3 (B) | 6.2 (A) | 5.7 (A) | 0.2 (D) |
| Com. Ex. 8 | 15 | O | 1 | 100/14 | — | 2.8 (A) | 0.3 (D) | 5.6 (A) | 5.7 (A) | 1.8 (D) |
| Com. Ex. 9 | 23 | Q | 1 | 100/14 | 462 | 0.3 (D) | 1.1 (B) | 4.5 (B) | 4.3 (B) | 4.2 (B) |

TABLE 4

| | | | | Main agent/ Curing agent | Urethane bond equivalent | Moist-heat resistance result (N/15 mm) | | | | | |
|---|---|---|---|---|---|---|---|---|---|---|---|
| | | | | | | PVF corona-treated surface/ PVF corona-treated surface | | | ETFE corona-treated surface/ ETFE corona-treated surface | | |
| | Main agent | Polyol | Curing agent | (weight ratio) | of Polyol (g/eq) | Initial | After 1 month | After 3 months | Initial | After 1 month | After 3 months |
| Ex. 23 | 1 | A | 1 | 100/14 | 424 | 6.3 (A) | 6.2 (A) | 6.2 (A) | 5.1 (A) | 4.5 (B) | 4.2 (B) |
| Ex. 24 | 2 | B | 1 | 100/14 | 445 | 7.3 (A) | 6.8 (A) | 6.3 (A) | 5.5 (A) | 5.1 (A) | 4.8 (B) |
| Ex. 25 | 3 | C | 1 | 100/14 | 463 | 7.5 (A) | 7.0 (A) | 6.3 (A) | 5.3 (A) | 5.0 (A) | 4.8 (B) |
| Ex. 26 | 4 | D | 1 | 100/14 | 470 | 7.2 (A) | 5.9 (A) | 4.8 (B) | 5.2 (A) | 4.8 (B) | 4.1 (B) |
| Ex. 27 | 5 | E | 1 | 100/14 | 479 | 7.2 (A) | 6.5 (A) | 5.2 (A) | 5.5 (A) | 4.2 (B) | 4.1 (B) |
| Ex. 28 | 6 | F | 1 | 100/14 | 450 | 7.7 (A) | 6.8 (A) | 6.7 (A) | 5.5 (A) | 5.6 (A) | 4.2 (B) |
| Ex. 29 | 7 | G | 1 | 100/14 | 562 | 6.7 (A) | 6.0 (A) | 5.2 (A) | 5.8 (A) | 5.4 (A) | 5.4 (A) |

TABLE 4-continued

| | Main agent | Polyol | Curing agent | Main agent/ Curing agent (weight ratio) | Urethane bond equivalent of Polyol (g/eq) | Moist-heat resistance result (N/15 mm) | | | | | |
|---|---|---|---|---|---|---|---|---|---|---|---|
| | | | | | | PVF corona-treated surface/ PVF corona-treated surface | | | ETFE corona-treated surface/ ETFE corona-treated surface | | | |
| | | | | | | Initial | After 1 month | After 3 months | Initial | After 1 month | After 3 months |
| Ex. 30 | 8 | H | 1 | 100/14 | 335 | 6.2 (A) | 5.7 (A) | 5.2 (A) | 6.0 (A) | 5.8 (A) | 5.6 (A) |
| Ex. 31 | 16 | B | 1 | 100/14 | 445 | 6.3 (A) | 5.4 (A) | 6.2 (A) | 4.5 (B) | 4.1 (B) | 3.4 (C) |
| Ex. 32 | 17 | B | 1 | 100/14 | 445 | 7.5 (A) | 6.0 (A) | 5.3 (A) | 4.3 (B) | 3.5 (C) | 3.3 (C) |
| Ex. 33 | 2 | B | 3 | 100/14 | 445 | 7.5 (A) | 5.9 (A) | 5.5 (A) | 5.2 (A) | 4.5 (B) | 4.7 (B) |
| Ex. 34 | 9 | I | 1 | 100/14 | 460 | 7.8 (A) | 6.1 (A) | 5.9 (A) | 5.9 (A) | 5.6 (A) | 5.1 (A) |
| Com. Ex. 10 | 14 | N | 1 | 100/14 | 463 | 6.2 (A) | 2.0 (C) | 0.2 (D) | 5.2 (A) | 2.2 (C) | 0.6 (D) |
| Com. Ex. 11 | 15 | O | 1 | 100/14 | — | 6.0 (A) | 4.4 (B) | 1.4 (D) | 6.5 (A) | 0.5-1.2 (Z) (D) | 0.1 (D) |

TABLE 5

| | Main agent | Polyol | Curing agent | Main agent/ Curing agent (weight ratio) | Urethane bond equivalent of Polyol (g/eq) | Moist-heat resistance result (N/15 mm) | | | | | |
|---|---|---|---|---|---|---|---|---|---|---|---|
| | | | | | | PVF corona-treated surface/ PVF corona-treated surface | | | ETFE corona-treated surface/ Aluminum foil | | |
| | | | | | | Initial | After 1 month | After 3 months | Initial | After 1 month | After 3 months |
| Ex. 35 | 2 | B | 1 | 100/14 | 445 | 5.9 (A) | 6.0 (A) | 5.7 (A) | 7.2 (A) | 7.5 (A) | 7.1 (A) |
| Com. Ex. 12 | 14 | N | 1 | 100/14 | 463 | 6.2 (A) | 5.5 (A) | 0.2 (D) | 7.4 (A) | 5.8 (A) | 0.6 (D) |
| Com. Ex. 13 | 15 | O | 1 | 100/14 | — | 8.1 (A) | 2.8 (C) | 0.1 (D) | 8.5 (A) | 7.2 (A) | 1.5 (D) |

TABLE 6

| | Main agent | Polyol | Curing agent | Main agent/ Curing agent (weight ratio) | Heat stabilizer | Discoloration after heating (Δb value) |
|---|---|---|---|---|---|---|
| Ex. 36 | 20 | B | 1 | 100/14 | non | 8.7 (C) |
| Ex. 37 | 21 | B | 1 | 100/14 | About 1% | 3.3 (B) |
| Ex. 38 | 2 | B | 1 | 100/14 | About 3% | 1.9 (A) |
| Ex. 39 | 22 | B | 1 | 100/14 | About 5% | 1.8 (A) |

INDUSTRIAL APPLICABILITY

According to the present invention, by including a main agent containing: a polyether polyurethane polyol whose urethane bond equivalent is adjusted to 320 to 600 g/eq by reacting a polyalkylene glycol including repeating units each having a carbon number of 3 or 4 and an alkane diol monomer with an organic diisocyanate at a predetermined equivalent ratio: and a bisphenol A-type epoxy resin being of a solid state or a semisolid state at normal temperature, and a curing agent, it is possible to provide an adhesive agent composition capable of exhibiting high peeling strength with respect to a resin substrate (especially, an untreated resin substrate) just after lamination and appropriately keeping the peeling strength after aging, and having excellent moist-heat resistance for a long period of time. Thus, the present invention has industrial applicability.

What is claimed is:

1. An adhesive agent composition, comprising:
    a main agent containing a polyether polyurethane polyol and a bisphenol A-type epoxy resin; and
    a curing agent,
    wherein the polyether polyurethane polyol is obtained by reacting a polyalkylene glycol including repeating units each having a carbon number of 3 or 4 and an alkane diol monomer with an organic diisocyanate at an equivalent ratio (NCO/OH) of 0.7 or more but less than 1, a weight average molecular weight thereof is in the range of 20,000 to 70,000, and an urethane bond equivalent thereof is in the range of 320 to 600 g/eq, and
    wherein a number average molecular weight of the bisphenol A-type epoxy resin is in the range of 400 to 5,000, and the bisphenol A-type epoxy resin is of a solid state or a semisolid state at normal temperature.

2. The adhesive agent composition as claimed in claim 1, wherein a carbon number of the alkane diol monomer is in the range of 2 to 9.

3. The adhesive agent composition as claimed in claim 1, wherein the curing agent contains a multifunctional polyisocyanate.

4. The adhesive agent composition as claimed in claim 3, wherein the multifunctional polyisocyanate contains at least a multifunctional polyisocyanate having an isocyanurate structure.

5. The adhesive agent composition as claimed in claim 4, wherein the multifunctional polyisocyanate contains the multifunctional polyisocyanate having the isocyanurate structure in an amount of 50 to 100 wt %.

6. The adhesive agent composition as claimed in claim 1, further comprising a heat stabilizer in an amount of 1 to 5 parts by weight with respect to 100 parts by weight of all non-volatile components contained in the main agent.

7. The adhesive agent composition as claimed in claim 1, wherein the adhesive agent composition is a laminate adhesive agent used for bonding a first substrate having a substituent group containing a fluorine atom on a surface thereof and a second substrate together.

8. The adhesive agent composition as claimed in claim 7, wherein at least the surface of the first substrate is formed of a fluoro-based resin as a major component thereof.

9. The adhesive agent composition as claimed in claim 7, wherein the second substrate is formed of at least one of a resin material and a metal material.

10. The adhesive agent composition as claimed in claim 9, wherein the resin material mainly contains a fluoro-based resin.

11. A laminated body obtained by using the adhesive agent composition defined by claim 1.

* * * * *